No. 794,815. PATENTED JULY 18, 1905.
F. A. SEIBERLING.
VEHICLE TIRE AND RIM.
APPLICATION FILED SEPT. 19, 1904.

Witnesses:
A. E. Kling
Glenara Fox

Inventor:
F. A. Seiberling
by C. E. Humphrey
Atty.

No. 794,815. Patented July 18, 1905.

UNITED STATES PATENT OFFICE.

FRANK A. SEIBERLING, OF AKRON, OHIO.

VEHICLE TIRE AND RIM.

SPECIFICATION forming part of Letters Patent No. 794,815, dated July 18, 1905.

Application filed September 19, 1904. Serial No. 225,100.

*To all whom it may concern:*

Be it known that I, FRANK A. SEIBERLING, a citizen of the United States, residing at Akron, in the county of Summit and State of Ohio, have invented a certain new and useful Improvement in Vehicle Tires and Rims, of which the following is a complete specification.

My invention relates to the application of cushioned tires to wheel-rims and devices for detachably retaining them.

The objects of this invention are to so combine a cushion-tire and wheel-rim that the tire will at all times be firmly held in position and secured effectually against "creeping" or other displacement and to provide a device for securely uniting the tire and rim together, so that the tire may be readily placed in position at any time and readily removed from its seat for the purposes of repair or replacement; and a further object is to so construct the tire-retaining mechanism that when being placed in position in conjunction with a tire it will have the function of drawing the tire downward firmly upon the base-rim, upon which it will seat. In accomplishing these objects I utilize three instrumentalities—first, an elastic or cushioned tire; secondly, a base or seat therefor, and, thirdly, contractible or retaining means whose office is to draw the tire firmly to the seat and then lock it in position, so as to firmly secure it against circumferential motion and yet permit the tire to be capable of a ready removal from connection with the retaining means, to the end that it may be easily repaired or replaced either in part or in whole.

To the accomplishment of the aforesaid objects my invention consists in the novel and peculiar construction, arrangement, and combination of parts hereinafter described, reference being had to the accompanying drawings, forming a part hereof.

Figure 1:
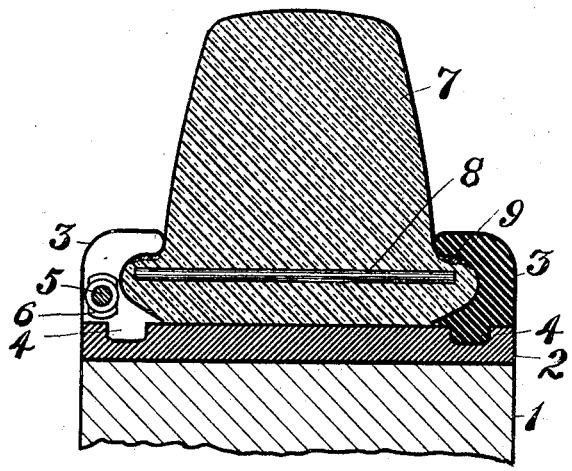
Figure 2:
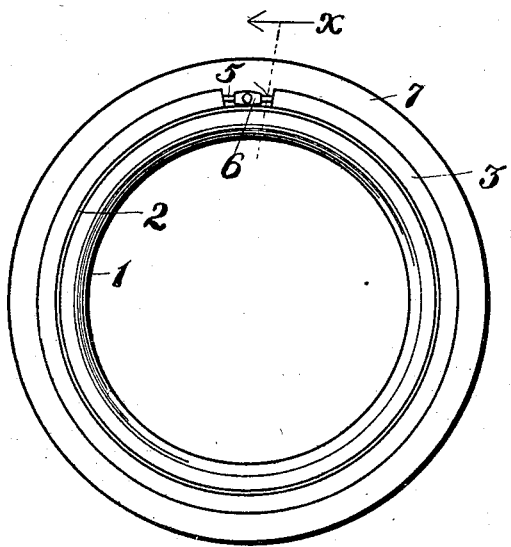

In the accompanying drawings, in which similar reference-numerals indicate like parts in the different figures, Figure 1 is a transverse section of a wheel rim and tire at the line X of Fig. 2; and Fig. 2 an elevation of the tire, rim, and felly.

In the drawings, 1 represents an ordinary flat-faced felly of a vehicle-wheel, upon which is mounted a band or base-rim 2. Arranged to be mounted upon the outside periphery of the base-rim 2 and near its outer sides are two contractible bands 3, with relatively vertical outside edges and with approximately flat upper faces, the upper and outside edges being preferably joined by a curvilinear portion. The inner sides of these bands 3 are concaved and are gradually sloped to the base-rim 2, the upper portion thereof joining the upper portion of the bands with a rounded surface, for the reason that they are intended to engage the cushioned tire, and to avoid a tendency to cut and wear the same are made with as little sharpness as possible.

The bottom face of the bands 3 are preferably provided with projecting circumferential ridges 4, which are adapted and arranged to enter grooves on the outer surface of the band 2, and thereby form a securing means against lateral or sidewise displacement. I do not, however, wish to confine myself to the fact of placing the ridges 4 on the bands 3, as it is within the scope of my invention to place a ridge or rib upon the base-rim 2 and an indentation in the bands 3, or there may be, in fact, other desired or preferred coöperating means employed to insure against a lateral or sidewise displacement of these bands 3. These bands 3 are made in a single piece and are bent into a circular form of any radius to effectually seat on the base-rim 2 and leave a slight space between their otherwise abutting ends. In the ends of these bands are placed right and left threaded studs 5, and these are secured in the ends of an ordinary turnbuckle 6, by which the ends of the bands 3 are drawn toward and forced from each other to provide for their contraction upon the base-rim 2 and release therefrom.

Mounted upon the base-rim 2 is a solid elastic or cushioned tire 7, having any required or preferred tread conformation, with extended side ridges near its base integral with the body of the tire and having preferably transverse to its longitudinal axis a series of bars or rods 8, so placed that their ends extend into the side ridges near the base of the tire, but are included in the rubber, so that a body of rubber exists above and below them and keeps them from vertical contact with the bands 3. If it is found that other means are preferable to the use of the transverse rods or bars 8 for stiffening the base portion of the tire 7, such as a series of strips of duck or canvas or the making of the base portion of a composition that will vulcanize relatively hard, they may be employed.

If desired, there may be a layer of duck or canvas 9 placed on the upper surface of the lateral ridges of the tire which bears against the face of the inturned hook-like portion of the bands 3 for the purpose of preventing undue wear or abrasion of the tire at these points.

It will be obvious that the operation of placing the tire 7 in position will be a matter of relatively no difficulty when the bands shown herein are used, for the reason that their concave inner faces can readily be forced over the lateral ridges of the tire and their contraction on the base-rim successfully attained by the simple manipulation of the turnbuckles to bring them to perfect coöperation with the base-rim, thereby avoiding the usually difficult task, first, of stretching the tires over a side flange to cause them to properly seat where endless tires are employed; secondly, straining and brazing longitudinal wires where they are used as a fastening means, and, thirdly, the accurate placing of transverse bolts where annular side flanges are bolted to the felly as a tire-retaining means. It will be thus seen that in addition to the novel structure herein presented the ease and simplicity of its use in the placement and removal of the tires for any purpose becomes a distinct factor in recommending its employment.

What I claim is—

1. The combination with a base-rim, of contractible bands having inturned hook-shaped sides, coöperating means on said rim and bands to prevent lateral displacement of said bands, and an elastic tire with side ridges to enter said bands having embedded transverse rods or bars extending into the ridges of said tire and under the overhanging portions of said bands substantially as shown and described.

2. The combination with a base-rim on the felly of a vehicle-wheel, of an elastic tire to seat on said rim having lateral ridges, embedded transverse rods or bars in said tire projecting into said ridges, bands capable of contraction and expansion arranged to engage said ridges and force said tire onto said rim and coöperating means on said bands and rim to prevent lateral movement of said bands.

3. A vehicle-wheel-cushioning means involving three instrumentalities, first an elastic tire with laterally-projecting integral members and transverse embedded rods or bars extending into said members, secondly a base-rim on the wheel-felly, and thirdly a pair of contractible bands arranged to engage said members of said tire and having means to coöperate with means on said rim to prevent their lateral displacement.

4. The combination with a wheel-rim, of an elastic tire mounted thereon, having a smooth outer face throughout and further provided with a laterally-extending ridge on each side, transversely-extending rods embedded in the base of the tire and terminating into said ridges at a point removed from the periphery thereof, and contractible, expansible and detachable bands mounted upon said rim and adapted to engage and compress the ridges of the tire for retaining the latter in position.

5. The combination with a wheel-rim, of an elastic tire mounted thereon, having a smooth outer face throughout and further provided with a laterally-extending ridge on each side, transversely-extending rods embedded in the base of the tire and terminating into said ridges at a point removed from the periphery thereof, contractible, expansible and detachable bands mounted upon said rim and adapted to engage and compress the ridges of the tire for retaining the latter in position, and means carried by the bands and coöperating with means provided on the rim for preventing lateral movement of said bands.

In testimony that I claim the above I hereunto set my hand in the presence of two subscribing witnesses.

FRANK A. SEIBERLING.

In presence of—
C. E. BINGHAM,
C. E. HUMPHREY.